(12) United States Patent
Forutanpour et al.

(10) Patent No.: US 8,867,991 B2
(45) Date of Patent: Oct. 21, 2014

(54) USE OF PROXIMITY SENSORS WITH NEAR-FIELD COMMUNICATION

(75) Inventors: Babak Forutanpour, San Diego, CA (US); Dimosthenis Kaleas, Carlsbad, CA (US); William T. Frantz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 203 days.

(21) Appl. No.: 13/422,839

(22) Filed: Mar. 16, 2012

(65) Prior Publication Data

US 2013/0244575 A1  Sep. 19, 2013

(51) Int. Cl.
*H04B 5/00* (2006.01)
*G06F 15/16* (2006.01)
*G01B 5/14* (2006.01)

(52) U.S. Cl.
USPC ........ 455/41.1; 709/227; 340/686.6; 702/158

(58) Field of Classification Search
CPC combination set(s) only.
See application file for complete search history.

(56) References Cited

U.S. PATENT DOCUMENTS

| | | | |
|---|---|---|---|
| 8,355,887 B1 * | 1/2013 | Harding et al. | 702/158 |
| 8,633,898 B2 * | 1/2014 | Westerman et al. | 345/173 |
| 2007/0197261 A1 | 8/2007 | Humbel | |
| 2008/0195735 A1 * | 8/2008 | Hodges et al. | 709/227 |
| 2009/0088204 A1 * | 4/2009 | Culbert et al. | 455/556.1 |
| 2009/0187375 A1 * | 7/2009 | Kinoshita et al. | 702/158 |
| 2009/0192898 A1 | 7/2009 | Baril | |
| 2009/0249478 A1 | 10/2009 | Rosener et al. | |
| 2010/0063893 A1 | 3/2010 | Townsend | |
| 2011/0037712 A1 | 2/2011 | Kim et al. | |
| 2011/0081923 A1 | 4/2011 | Forutanpour et al. | |
| 2011/0165841 A1 | 7/2011 | Baek et al. | |
| 2012/0066078 A1 | 3/2012 | Kingston et al. | |

OTHER PUBLICATIONS

International Search Report and Written Opinion—PCT/US2013/031007—ISA/EPO—Jun. 20, 2013.

* cited by examiner

*Primary Examiner* — Edward Urban
*Assistant Examiner* — Ralph H Justus
(74) *Attorney, Agent, or Firm* — Kilpatrick Townsend & Stockton LLP

(57) ABSTRACT

Various arrangements for selecting data for transmission from a mobile device are presented. Proximity data indicating proximity between one or more proximity sensors and a triggering entity may be collected by the mobile device. A type of near-field communication (NFC) transaction may be determined by the mobile device. Using the proximity data and the type of the NFC transaction, data to transmit to a remote NFC device may be determined.

27 Claims, 8 Drawing Sheets

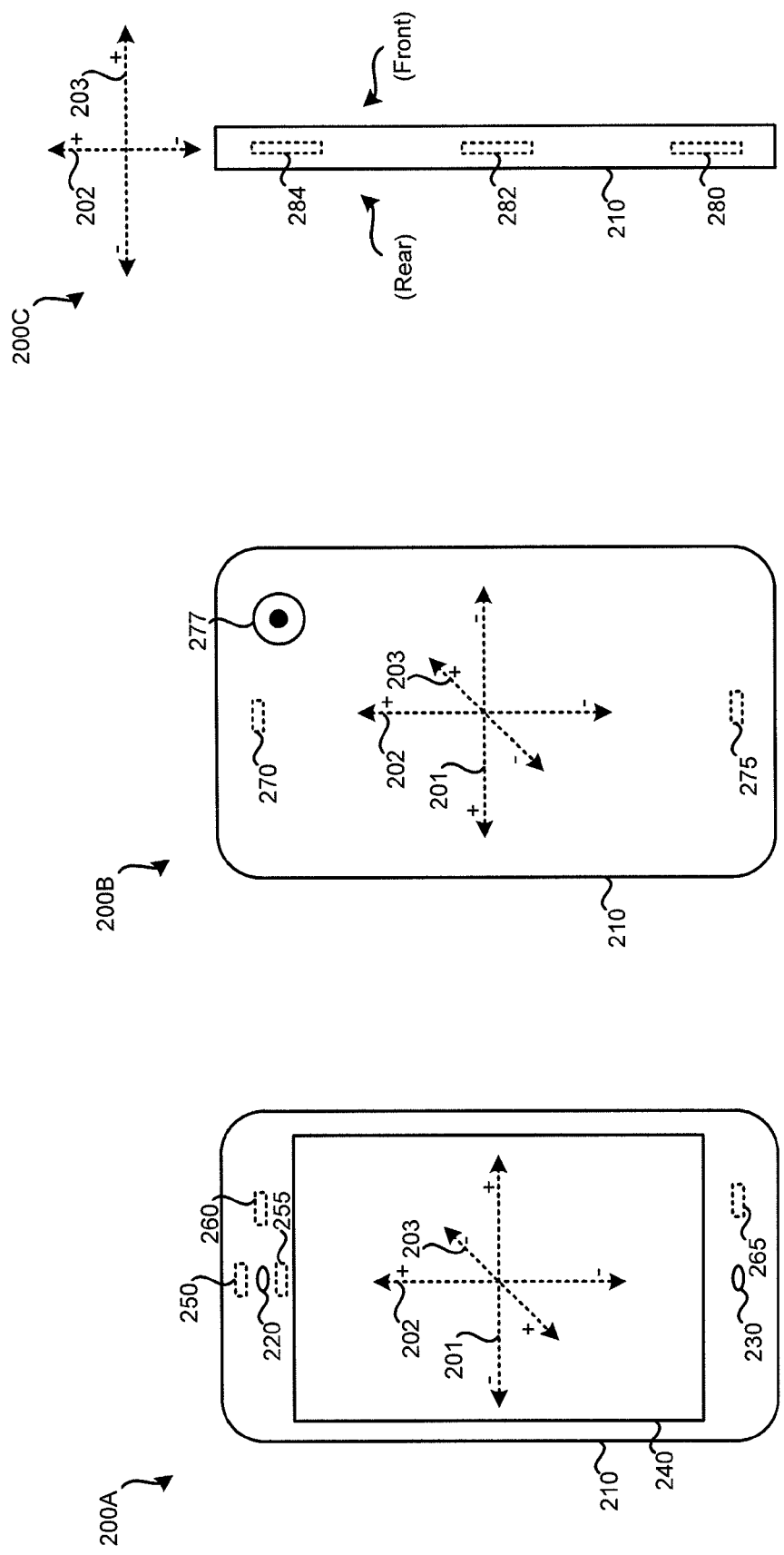

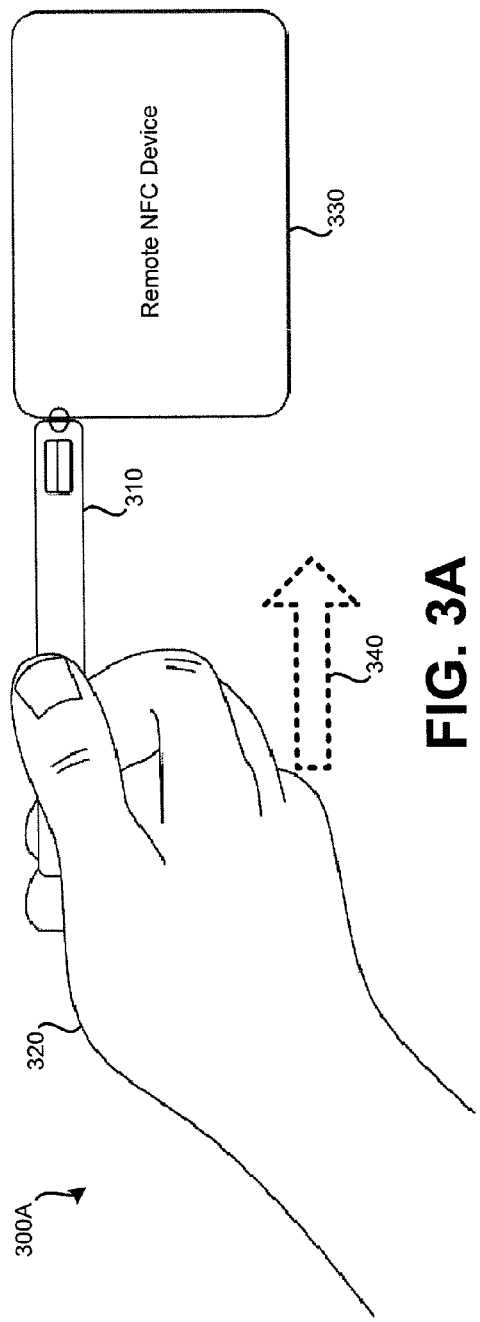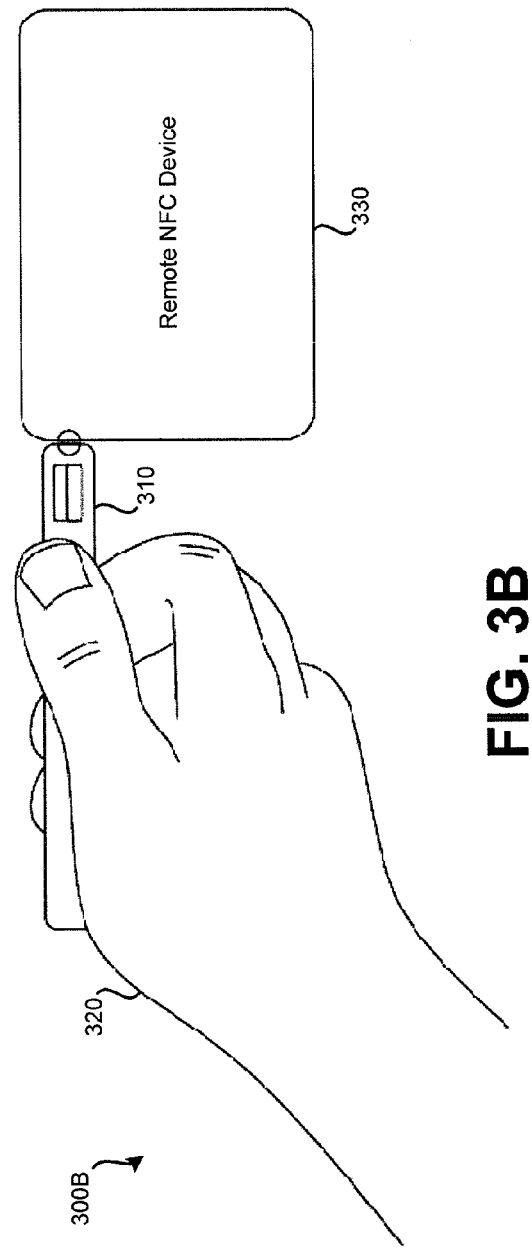

USE OF PROXIMITY SENSORS WITH NEAR-FIELD COMMUNICATION

BACKGROUND

Near-field communication (NFC) may be used to exchange data between two devices. For example, a mobile device, such as a cellular phone, may be used to conduct a financial transaction via NFC with a point-of-sale device. In such an arrangement, account information may be transmitted from the mobile device to the point-of-sale device via NFC. Typically, in conducting such a transaction, a user may need to interact with the mobile device via a display and/or buttons of the mobile device to indicate whether permission is granted for the NFC transaction and/or the data (e.g., an account number) that should be transmitted.

SUMMARY

In some embodiments, a method for selecting data for transmission from a mobile device is presented. The method may include collecting, by the mobile device, proximity data indicating proximity between one or more proximity sensors and a triggering entity. The method may include determining, by the mobile device, a type of near-field communication (NFC) transaction. The method may include determining, by the mobile device, using the proximity data and the type of the NFC transaction, data to transmit to a remote NFC device.

Embodiments of such a method may include one or more of the following: Determining, by the mobile device, using the proximity data and the type of the NFC transaction, data to transmit to the remote NFC device may comprise determining a gesture using the proximity data. The gesture may be performed by a hand of a user. The triggering entity may be the hand of the user. The method may include determining, by the mobile device, using the gesture and the type of the NFC transaction, data to transmit to the remote NFC device. The gesture may comprise the user sliding the mobile device through a grip of the hand of the user. The gesture may further comprise the remote NFC device being used as an anchor point for the user to slide the mobile device through the grip of the hand of the user. Determining the gesture using the proximity data may comprise determining, by the mobile device, a location on the mobile device where the user ceases sliding the mobile device though the hand of the user, wherein the data to transmit to the remote NFC device is at least partially based on the location. Determining the gesture using the proximity data may comprise determining, by the mobile device, a location on the mobile device where the user commences sliding the mobile device though the hand of the user, wherein the data to transmit to the remote NFC device is at least partially based on the location. The method may include collecting, by the mobile device, acceleration data. Determining, by the mobile device, using the proximity data and the type of the NFC transaction, data to transmit to the remote NFC device may comprise determining, by the mobile device using the proximity data, the acceleration data, and the type of the NFC transaction, the data to transmit to the remote NFC device. The method may include transmitting the data to the remote NFC device. The one or more proximity sensors may be capacitive proximity sensors.

In some embodiments, a mobile device configured to select data for transmission is presented. The mobile device may include one or more proximity sensors. The mobile device may include a near-field communication transceiver. The mobile device may include a processor. The mobile device may include a memory communicatively coupled with and readable by the processor and having stored therein processor-readable instructions. The processor-readable instructions which, when executed by the processor, cause the processor to analyze proximity data indicating proximity between the one or more proximity sensors and a triggering entity. The processor-readable instructions which, when executed by the processor, cause the processor to determine a type of near-field communication (NFC) transaction. The processor-readable instructions which, when executed by the processor, cause the processor to determine using the proximity data and the type of the NFC transaction, data to transmit to a remote NFC device.

Embodiments of such a mobile device may include one or more of the following: The processor-readable instructions, which, when executed by the processor, cause the processor to determine, using the proximity data and the type of the NFC transaction, data to transmit to the remote NFC device may further comprise processor-readable instructions, which, when executed, cause the processor to determine a gesture using the proximity data. The gesture may performed by a hand of a user. The triggering entity may be the hand of the user. The processor-readable instructions, which, when executed by the processor, cause the processor to determine using the gesture and the type of the NFC transaction, data to transmit to the remote NFC device. The gesture may comprise the user sliding the mobile device through a grip of the hand of the user. The gesture may further comprise the remote NFC device being used as an anchor point for the user to slide the mobile device through the grip of the hand of the user. The processor-readable instructions, which, when executed by the processor, cause the processor to determine the gesture using the proximity data may further comprise processor-readable instructions, which, when executed, cause the processor to determine a location on the mobile device where the user ceases sliding the mobile device though the hand of the user, wherein the data to transmit to the remote NFC device is at least partially based on the location. The processor-readable instructions, which, when executed by the processor, cause the processor to determine the gesture using the proximity data may further comprise processor-readable instructions, which, when executed, cause the processor to determine a location on the mobile device where the user commences sliding the mobile device though the hand of the user, wherein the data to transmit to the remote NFC device is at least partially based on the location.

Further, embodiments of such a mobile device may include one or more of the following: The mobile device may further comprise an accelerometer. The processor-readable instructions may further comprise processor-readable instructions, which, when executed by the processor, cause the processor to analyze acceleration data received from the accelerometer, wherein the processor-readable instructions, which, when executed by the processor, cause the processor to determine, using the proximity data and the type of the NFC transaction, data to transmit to the remote NFC device may further comprise processor-readable instructions, which, when executed, cause the processor to determine, using the proximity data, the acceleration data, and the type of the NFC transaction, the data to transmit to the remote NFC device. The processor-readable instructions may further comprise processor-readable instructions, which, when executed by the processor, cause the processor to cause the data to be transmitted to the remote NFC device. The one or more proximity sensors may be capacitive proximity sensors.

In some embodiments, a computer program for selecting data for transmission is presented. The computer program may comprise processor-readable instructions, which, when executed by a processor, cause the processor to analyze proximity data indicating proximity between one or more proximity sensors and a triggering entity. The computer program may comprise processor-readable instructions, which, when executed by a processor, cause the processor to determine a type of near-field communication (NFC) transaction. The computer program may comprise processor-readable instructions, which, when executed by a processor, cause the processor to determine using the proximity data and the type of the NFC transaction, data to transmit to a remote NFC device.

Embodiments of such a computer program may include one or more of the following: The processor-readable instructions, which, when executed by the processor, cause the processor to determine, using the proximity data and the type of the NFC transaction, data to transmit to the remote NFC device may further comprise processor-readable instructions, which, when executed, cause the processor to determine a gesture using the proximity data. The gesture may be performed by a hand of a user. The triggering entity may be the hand of the user. The computer program may comprise processor-readable instructions, which, when executed by a processor, cause the processor to determine using the gesture and the type of the NFC transaction, data to transmit to the remote NFC device. The gesture may comprise the user sliding a mobile device through a grip of the hand of the user. The gesture may further comprise the remote NFC device being used as an anchor point for the user to slide the mobile device through the grip of the hand of the user. The processor-readable instructions, which, when executed by the processor, cause the processor to determine the gesture using the proximity data may further comprise processor-readable instructions, which, when executed, cause the processor to determine a location on the mobile device where the user ceases sliding the mobile device though the hand of the user, wherein the data to transmit to the remote NFC device is at least partially based on the location.

Further, embodiments of such a computer program may include one or more of the following: The processor-readable instructions, which, when executed by the processor, cause the processor to determine the gesture using the proximity data may further comprise processor-readable instructions, which, when executed, cause the processor to determine a location on the mobile device where the user commences sliding the mobile device though the hand of the user, wherein the data to transmit to the remote NFC device is at least partially based on the location. The processor-readable instructions may further comprise processor-readable instructions, which, when executed by the processor, cause the processor to analyze acceleration data, wherein the processor-readable instructions, which, when executed by the processor, cause the processor to determine, using the proximity data and the type of the NFC transaction, data to transmit to the remote NFC device may further comprise processor-readable instructions, which, when executed, cause the processor to determine, using the proximity data, the acceleration data, and the type of NFC transaction, the data to transmit to the remote NFC device. The processor-readable instructions may further comprise processor-readable instructions, which, when executed by the processor, cause the processor to cause the data to be transmitted to the remote NFC device. The one or more proximity sensors may be capacitive proximity sensors.

In some embodiments, an apparatus for selecting data for transmission from a mobile device is presented. The apparatus may include means for collecting proximity data indicating proximity to a triggering entity. The apparatus may include means for determining a type of near-field communication (NFC) transaction. The apparatus may include means for determining, using the proximity data and the type of the NFC transaction, data to transmit to a remote NFC device.

Embodiments, of such an apparatus may include one or more of the following: The means for determining, using the proximity data and the type of the NFC transaction, data to transmit to the remote NFC device may comprise means for determining a gesture using the proximity data. The gesture may be performed by a hand of a user. The triggering entity may be the hand of the user. The apparatus may include means for determining using the gesture and the type of the NFC transaction, data to transmit to the remote NFC device. The gesture may comprise the user sliding the mobile device through a grip of the hand of the user. The gesture may further comprise the remote NFC device being used as an anchor point for the user to slide the mobile device through the grip of the hand of the user. The means for determining the gesture using the proximity data may comprise means for determining a location on the mobile device where the user ceases sliding the mobile device though the hand of the user, wherein the data to transmit to the remote NFC device is at least partially based on the location. The means for determining the gesture using the proximity data may comprise means for determining a location on the mobile device where the user commences sliding the mobile device though the hand of the user, wherein the data to transmit to the remote NFC device is at least partially based on the location. The apparatus may include means for collecting acceleration data, wherein the means for determining, using the proximity data and the type of the NFC transaction, data to transmit to the remote NFC device may comprises means for determining, using the proximity data, the acceleration data, and the type of the NFC transaction, data to transmit to the remote NFC device. The apparatus may include means for transmitting the data to the remote NFC device.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 2A illustrates a front view of an embodiment of a mobile device configured to select data for transmission via NFC.

FIG. 2B illustrates a rear view of an embodiment of a mobile device configured to select data for transmission via NFC.

FIG. 2C illustrates a side view of an embodiment of a mobile device configured to select data for transmission via NFC.

FIG. 3A illustrates an embodiment of a gesture being performed using a mobile device configured to select data for transmission via NFC.

FIG. 3B illustrates another embodiment of a gesture being performed using a mobile device configured to select data for transmission via NFC.

DETAILED DESCRIPTION

Figure 1:
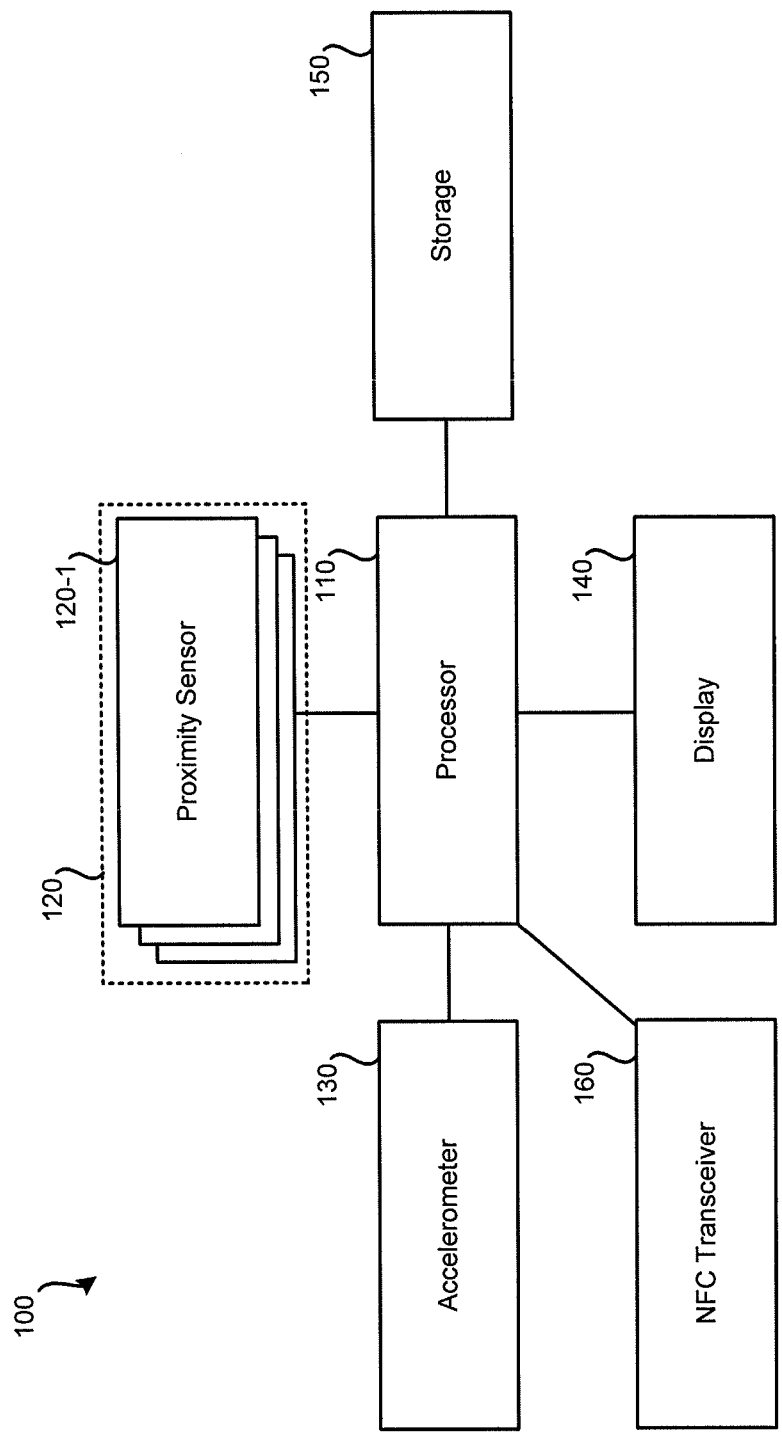
FIG. 1 illustrates an embodiment of a system configured to select data for transmission from a mobile device via NFC.

A gesture performed by a user can be determined by a mobile device using proximity sensors. Such a gesture may involve a user sliding the mobile device through a hand of the user. For example, the user may grasp the mobile device and hold it against a remote near field communication (NFC) device with which the user wishes to conduct a transaction. Using the remote NFC device as an anchor point, the mobile device may be slid through the user's hand. This sliding may serve to indicate permission to perform the NFC transaction and/or identify data that is to be transmitted via the NFC transaction. As an example, a user that is conducting a financial NFC transaction using a mobile device may hold the mobile device against a remote NFC device and slide the mobile device through the user's hand until the desired account of the user is selected. The user may then cease sliding the mobile device through the user's hand. The data transmitted to the remote NFC device may indicate the selected account. The sliding of the mobile device through the hand of the user may be detected using one or more proximity sensors located on the mobile device, such as on the sides of the mobile device. Similar gestures may be used to select other data to be transmitted to a remote NFC device for other types of NFC transactions, such as unlocking a vehicle door.

Near field communication may involve use of a low-power protocol for device-to-device communication over a short distance. In some instances, two devices communicating using NFC are in contact or otherwise in close proximity with each other. Data related to various types of transactions can be exchanged using NFC. For example, credit or debit account transactions can be performed by transmitting account information from a mobile device to a point-of-sale device configured to conduct NFC purchase transactions. As another example, an NFC device may be installed on a vehicle to allow various functions to be performed, such as unlocking doors, lowering windows, and/or starting the vehicle's engine.

Besides sliding, other gestures performed by a user that are sensed using one or more proximity sensors may be used to determine particular data to be transmitted by a mobile device. As an example, when making a purchase transaction, a user may desire to select from a group of accounts available to use for the purchase transaction. Based on where the user grips the mobile device (e.g., near the top, middle, or bottom of the mobile device), a different account may be used for the purchase transaction. The user may have previously associated a first credit account with the top grip position, a debit account with the middle grip position, and a second credit account with the bottom grip position. As such, the user can quickly conduct a purchase transaction, possibly without needing to activate a display of the mobile device.

Similar gestures may be used in relation to a vehicle: a grip position of the user may be used to identify a function that the user desires to perform on the vehicle. For example, a grip near the top of the phone, when the mobile device is held to the remote NFC device of the vehicle, may result in the driver's door being unlocked. A middle grip may result in all of the doors being unlocked. A bottom grip may unlock all doors and roll the windows down. Also, a sliding gesture may be used. Using the remote NFC device of the vehicle as an anchor, the user, possibly using one hand, may slide the mobile device through the user's hand to indicate a function to be performed. Such functions may be customized by the user.

Proximity sensors can be used to detect when a portion of a human body (e.g., finger, leg, ear, chest) is either 1) in contact with a proximity sensor or 2) near the proximity sensor (these two conditions being collectively referred to as "proximate" to the proximity sensor). One type of proximity sensor is a capacitive proximity sensor that detects changes in capacitance. Such a capacitive proximity sensor may include one or two electrodes. A dual-electrode capacitive proximity sensor may detect the presence of a portion of a human body by measuring changes in capacitance between the two electrodes. Use of a capacitive proximity sensor may have the advantage of being more likely to be triggered by a human body than by inanimate objects, such as being near or in contact with a piece of cloth or plastic. Further, because capacitive proximity sensors can be triggered if a portion of a human body is near but not touching the capacitive proximity sensor, the portion of the human body may trigger the capacitive proximity sensor through thin materials such as cloth (e.g., pants, gloves) and mobile device cases.

Proximity sensors, which may be capacitive proximity sensors, may be arranged on a mobile device (e.g., a smartphone, a cellular phone, gaming device) to detect where the mobile device is located in relation to a triggering entity, such as a user's body. For example, the capacitive proximity sensors may be used to determine where the mobile device is being gripped by the user. To do this, dual-electrode capacitive proximity sensors can be used. A first capacitive proximity sensor may be positioned such that its electrodes are on opposite sides of the mobile device near the top of the sides of the mobile device where a user can grip the mobile device with a hand. Second and third capacitive proximity sensors may be positioned such that their electrodes are on opposite sides of the mobile device near the middle and bottom of the sides of the mobile device where a user can grip the mobile device with a hand, respectively. As such, based on where a user is gripping the mobile device, different proximity sensors may indicate proximity to the user's hand and/or may output proximity data indicating a different magnitude. The greater the magnitude in value, the closer a triggering entity, such as a user's hand, may be expected to be.

FIG. 1 illustrates an embodiment of a system 100 configured to select data for transmission from a mobile device via NFC. System 100 includes: processor 110, proximity sensors 120, accelerometer 130, display 140, storage 150, and NFC transceiver 160. System 100 may be part of a larger system. For example, system 100 may be part of a mobile device that contains additional components. For example, the mobile device that system 100 may be a part of may be a smartphone, a cellular phone, a tablet computer, a personal digital assistant, or gaming device, to name only a few examples. System 100 may be part of the computer system, such as computer system 800 of FIG. 8.

Processor 110 may represent a general purpose or specialized processor configured to receive and process data from one or more sensors, such as proximity sensors 120 and accelerometer 130, interact with storage 150 and display 140, and communicate with NFC transceiver 160.

Processor 110 may be in communication with proximity sensors 120. System 100 may include one or more proximity sensors 120. As such, some embodiments may have two, three, four, or more proximity sensors in communication with processor 110. Each proximity sensor, such as proximity sensor, 120-1, may include a single-electrode capacitive proximity sensor. In some embodiments, one or more of the proximity sensors may be dual-electrode capacitive proximity sensors. As such, each proximity sensor, such as proximity sensor 120-1, may include one or two electrodes. Each of these proximity sensors may periodically transmit data to processor 110 that indicates whether a triggering entity is within range of the proximity sensor. Each proximity sensor may also transmit a magnitude value that indicates how close a triggering entity is to the electrode(s) of the proximity sensor. The triggering entity may be any entity that causes the measured capacitance by the proximity sensor to vary. When being used by a user, the user's body may serve as the triggering entity. As such, a user's hand near a proximity sensor may be sensed by the proximity sensor. Such proximity sensors may be configured to determine when a triggering entity is in contact with the proximity sensor and when a triggering entity is close to the proximity sensor (collectively referred to as proximate). As such, for each proximity sensor of proximity sensors 120 to detect the presence of a triggering entity, the triggering entity does not need to be in direct contact with one or more electrodes of the proximity sensor.

While the above description of proximity sensors focuses on the use of capacitive proximity sensors, it should be understood that in some embodiments proximity sensors other than capacitive proximity sensors may be used. Further, some embodiments may use multiple types of proximity sensors; for example, a mobile device may contain both single-electrode and dual-electrode capacitive proximity sensors and/or other types of proximity sensors.

Processor 110 may also be in communication with one or more accelerometers, such as accelerometer 130. Accelerometer 130 may provide acceleration data to processor 110. Such acceleration data may indicate a direction of acceleration and a magnitude of acceleration. For example, at least when approximately still, the effect of gravity on accelerometer 130 may result in acceleration data from accelerometer 130 indicating a direction toward the ground and having a magnitude similar to the acceleration of gravity. In some embodiments, more accurate results may be achieved by receiving acceleration data from multiple accelerometers. Such data may be averaged or otherwise combined by processor 110.

Processor 110 may also be in communication with display 140. Display 140 may be used to visually present text and/or graphics to a user of a mobile device. Whether display 140 is active or inactive (e.g., turned on or off) may be based on data received from proximity sensors 120. For example, display 140 may be activated when proximity data from proximity sensors 120 indicate that the mobile device containing system 100 is being held in the hand of the user. If data from proximity sensors 120 indicate that the mobile device containing system 100 is being held in the hand of the user and is likely proximate to an ear of the user, display 140 may be inactivated because the user is unlikely to be viewing display 140. When data from proximity sensors 120 indicate that the mobile device has been moved away from in ear of the user, display 140 may be reactivated. As such, power consumed by display 140 may be decreased by decreasing the amount of time that display 140 is active.

Processor 110 may be able to read from and write data to storage 150. Storage 150 may be used to store an indication of which gestures are linked with which data.

NFC transceiver 160 may be in communication with processor 110. NFC transceiver 160 may be used to communicate with remote NFC devices (not illustrated). NFC transceiver 160 may be configured to transmit and/or receive data. NFC transceiver 160 may involve active and/or passive NFC communication. NFC transceiver 160 may automatically participate in a handshake operation with a remote NFC device to determine a type of NFC transaction permitted to be conducted.

FIG. 2A illustrates a front view of an embodiment of a mobile device 200A configured to select data for transmission via NFC. Mobile device 200A may include system 100 of FIG. 1 or some other system configured to select data for transmission via NFC. As illustrated, the front of mobile device 200A is shown with display 240. Mobile device 200A may include case 210. Mobile device 200A may also include speaker 220 and microphone 230. Coupled with case 210 may be a plurality of proximity sensors, such as proximity sensors 250, 255, 260, and 265. Proximity sensors 250 and 255 may represent two single-electrode proximity sensors or two electrodes of a single dual-electrode proximity sensor. Proximity sensors 250 and 255 may be used to determine when the speaker of mobile device 200A is likely proximate to a user's ear. Proximity sensors 260 and 265 may represent two single-electrode proximity sensors or two electrodes of a single dual-electrode proximity sensor. Proximity sensors 260 and 265 may be used to determine when mobile device 200A is against the body of the user, such as in a shirt or pant pocket. Proximity sensors 260 and 265 may be represented from each other enough such that the presence of common pocket items, such as change and/or keys, is not mistaken for proximity to a user's body. Each proximity sensor is illustrated using dotted lines to indicate that each proximity sensor may not be visible external to the mobile device, rather each proximity sensor may be located within case 210 such that the proximity sensors are not visible to a user. In some embodiments, the proximity sensors may be arranged such as to be visible to users.

FIG. 2B illustrates a rear view of an embodiment of a mobile device configured to select data for transmission via NFC. Mobile device 200B may be mobile device 200A of FIG. 2A viewed from a different perspective (e.g., from the rear of mobile device 200A such that display 240 is not visible). Coupled with the rear (also referred to as the back) of case 210 may be a plurality of proximity sensors, such as proximity sensors 270 and 275. Proximity sensors 270 and 275 may represent two single-electrode proximity sensors or two electrodes of a single dual-electrode proximity sensor. Proximity sensors 270 and 275 may be used to determine when mobile device 200B is against the body of the user, such as in a shirt or pant pocket. Proximity sensors 270 and 275 may be separated from each other enough such that the presence of common pocket items, such as change and/or keys, is not mistaken for proximity to a user's body. Proximity sensors 270 and 275 are illustrated using dotted lines to indicate that each proximity sensor may not be visible, rather each proximity sensor may be located within case 210 such that the proximity sensors are not visible to a user. The number of proximity sensors on mobile device 200B is for example purposes only, more or fewer proximity sensors may be present on each side.

Also present on mobile device 200B is camera 277. Camera 277 may be used for capturing still images and/or video. Camera 277 may also be used for purposes such as augmented reality functions, video chat, etc. In some embodiments, alternatively or additionally, a front-facing camera may be present on mobile device 200A.

FIG. 2C illustrates a side view of an embodiment of a mobile device configured to select data for transmission via NFC. Mobile device 200C may be mobile device 200A of FIG. 2A and mobile device 200B of FIG. 2B viewed from a side, such as the left or right. Proximity sensors 280, 282, and 284 may be present on mobile device 200C. Each of proximity sensors 280, 282, and 284 may be a single-electrode capacitive proximity sensor or may represent an electrode of a dual-electrode proximity sensor. Another proximity sensor (or electrode of a dual capacitive proximity sensor) may be on the opposite side of mobile device 200C to complement proximity sensors 280, 282, and 284. As such, proximity to the region where a user typically grips the mobile device during use (e.g., conducting a phone call, reading email) may be sensed by proximity sensor 280 (and the complementary proximity sensor or electrode). As mobile device 200C is slid through a user's hand, measurement of proximity (and/or magnitude) to a triggering entity by proximity sensors 280, 282, and 284 may change. It should be understood that three proximity sensors are present on the side of mobile device 200C for illustration purposes only: greater or fewer numbers of proximity sensors may be present in other embodiments. It should also be noted that because a magnitude indicating proximity to a triggering entity may be measured by each proximity sensor, the position of a user's hand may be able to be detected with greater precision than the number of proximity sensors (e.g., with three proximity sensors, more than three positions of a user's hand along mobile device 200C may be determined).

Also illustrated in FIGS. 2A through 2C are imaginary axes, represented by dotted arrows. Such axes are in a coordinate system of the mobile device. The direction of acceleration as detected by one or more accelerometers of a mobile device may be interpreted in accordance with such a coordinate system. Referring to FIG. 2A, x-axis 201 is positive to the right (as illustrated) and negative to the left (as illustrated). Y-axis 202 is positive toward the top (as illustrated) of mobile device 200A, and negative toward the bottom (as illustrated). Z-axis 203 passes through mobile device 200A as illustrated in FIG. 2C. The polarity of x-axis 201 and z-axis 203 appear reversed in FIG. 2B; this is because the mobile device is flipped and, as such, to remain in the coordinate system of the mobile device, these axes must also be flipped. FIG. 2C illustrates y-axis 202 and z-axis 203. In FIG. 2C, the front of the device containing display 240 (not shown) is on the right (as illustrated).

Acceleration data, as collected by one or more accelerometers of a mobile device, may indicate a direction in terms of the coordinate system of the mobile device indicated by the axes of FIGS. 2A-2C or some other coordinate system that similarly indicates a direction in relation to the mobile device. Such acceleration data may be used by itself or in conjunction with other data such as proximity data to identify a gesture performed by the user with the mobile device (e.g., such as sliding the mobile device through a hand and rotating the mobile device). Depending on how the user is gripping the mobile device, the mobile device may be held at a different angle to the user, thus resulting in acceleration due to gravity occurring in a different direction in relation to the mobile device. For example, whether the mobile device is held with its face facing upward or downward may be determined using acceleration data.

One possible type of gesture performed by a user of mobile device to select data for transmission during an NFC transaction may include the user sliding the mobile device through his or her hand. FIG. 3A illustrates an embodiment 300A of a gesture being performed using a mobile device configured to select data for transmission via NFC. In embodiment 300A, hand 320 of a user is gripping mobile device 310 against remote NFC device 330.

Mobile device 310 may represent mobile device 200A, mobile device 200B, and/or mobile device 200C of FIGS. 2A-2C, respectively. As such, mobile device 310 may have some number of proximity sensors located on the sides of the mobile device, such that if mobile device 310 is slid through hand 320, the sliding can be detected using proximity data collect by mobile device 310 using data collected by proximity sensors. A display of mobile device 310, such as display 240 of FIG. 2A, may be facing upwards, such that as hand 320 is gripping mobile device 310, the display may be viewed.

Mobile device 310 may be held such that mobile device 310 is in proximity to remote NFC device 330, with which an NFC transaction is to be conducted. Remote NFC device 330 may, for example, be a point-of-sale device that is configured to conduct financial transactions via NFC or a locking device, such as a vehicle door, that can be locked and/or unlocked via an NFC transaction. Remote NFC device 330 may represent some other form of NFC device configured to conduct an NFC transaction with mobile device 310.

A user may use a gesture that includes performing a sliding motion of hand 320 in relation to mobile device 310 in order to select data for transmission to remote NFC device 330. In order for hand 320 to slide along mobile device 310, remote NFC device 330 may be used as an anchor to allow mobile device 310 to slide through hand 320. In order to slide mobile device 310, hand 320 may relax its grip such that mobile device 310 remains supported (and does not fall), but hand 320 can be moved as indicated by imaginary dotted arrow 340. Hand 320 may be in proximity to mobile device 310 on either side of mobile device 310 and/or the bottom (as illustrated) of mobile device 310. Hand 320 may be slid until the desired data to be transmitted is selected. As hand 320 is slid in relation to mobile device 310, a display of mobile device 310 may be dynamically updated to indicate the data selected for transmission.

FIG. 3B illustrates an embodiment 300B of a gesture being performed using a mobile device configured to select data for transmission via NFC. Embodiment 300B represents embodiment 300A after hand 320 has been slid a distance along mobile device 310. As such, mobile device 310 has remained at least approximately in the same position in relation to remote NFC device 330, but hand 320 has slid along mobile device 310. Which data is selected for transmission by the sliding gesture may be based on the position of hand 320 in relation to mobile device 310 when: the sliding gesture began, the sliding gesture ended, and/or the distance slid along mobile device 310.

Figure 4:
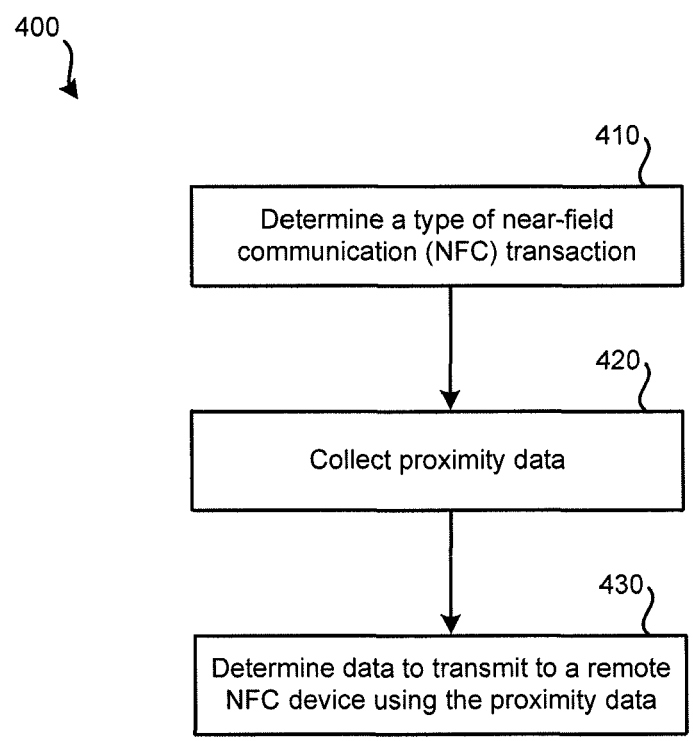
FIG. 4 illustrates an embodiment of a method for selecting data for transmission via NFC.

Various methods may be performed using system 100 of FIG. 1 and the mobile devices of FIGS. 2 and 3. FIG. 4 illustrates an embodiment of a method 400 for selecting data for transmission via NFC. Method 400 may be performed using system 100 or some other system configured to select data for transmission from a mobile device via NFC to a remote NFC device. Method 400 may be performed using a mobile device, such as the mobile devices of FIGS. 2 and 3. Means for performing each step of method 400 include a mobile device, which may include a system such as system 100 of FIG. 1, one or more proximity sensors, and/or a computer system.

At step 410, a type of NFC transaction may be determined. Determining the type of NFC transaction may involve receiving input from a user or conducting a handshake operation with a remote NFC device. When an NFC transaction is to be conducted, a user may select the type of transaction using the mobile device. For example, a display of the mobile device may allow a user to select from various types of available NFC transactions, such as: a financial transaction (e.g., a credit transaction, an e-cash transaction), an unlocking option (e.g., car, house), or a business card exchange. Other forms of NFC transactions may also be possible. The type of NFC transaction may also be determined via a handshake operation with a remote NFC device. When the mobile device is moved proximate to the remote NFC device and, possibly, the mobile device receives an indication from its user that an NFC transaction is to be performed, data may be received from the remote NFC device. This data may indicate the type of transaction that can occur. For example, if the remote NFC device is part of a point-of-sale device, the handshake operation may result in the remote NFC device indicating to the mobile device that a financial transaction is permitted. If the remote NFC device is part of a vehicle, the handshake operation may result in the remote NFC device indicating to the mobile device that an unlocking operation may occur. In some embodiments, the handshake operation may specify the type of device that the remote NFC device is. Based on this information, the mobile device may determine the type of NFC transaction that may occur. Whether the type of NFC transaction is specified by the user or determined via a handshake arrangement, following step 410, the mobile device may have stored an indication of what type of NFC transaction is to occur.

At step 420, proximity data may be collected by the mobile device using one or more proximity sensors present on the mobile device. Such proximity data may indicate: whether a triggering entity, such as a user's hand, is in proximity (touching or near) to the proximity sensor and/or a magnitude. Such a magnitude may be greater the closer a triggering entity is to the proximity sensor. As such, it may be possible to adjust sensitivity to triggering entities by setting a threshold magnitude of the mobile device used to determine whether a triggering entity is considered proximate to the proximity sensor or not. The greater the threshold, the closer the triggering entity may need to be to the proximity sensor for the triggering entity to be considered proximate to the proximity sensor. In some embodiments, if no proximity data is received from a proximity sensor, it may be assumed that a triggering entity is not proximate to the proximity sensor. The proximity sensors used in method 400 may be single- or dual-electrode capacitive proximity sensors.

At step 430, data to transmit to the remote NFC device may be determined. The data to be transmitted may be at least partially determined based on the proximity data collected at step 420. The proximity data collected at step 420 may indicate a gesture performed by a user of the mobile device. The gesture performed at step 420 may be performed without using a display of the mobile device. The gesture may involve how the mobile device is being held by a user, for example, whether the mobile device is being gripped near the top, middle, or bottom (wherein the top refers to the portion of the mobile device having a speaker and the bottom referring to the location on the mobile device where the microphone is located as illustrated in FIG. 2A). The gesture may also involve movement of the user's hand in relation to the mobile device. The mobile device may be slid through the user's hand. The data determined to be transmitted may be based on where the sliding motion of the user's hand begins on the mobile device, where the sliding motion of the user's hand ends on the mobile device, and/or the distance on the mobile device that the user's hand slides. As such, without providing input via one or more buttons or a touch screen, a user may provide input to the mobile device to indicate what data is to be transmitted via the NFC transaction.

As two exemplary implementations of method 400, the following embodiments are provided for illustration purposes: In a first embodiment, a user is conducting a financial transaction. At step 410, the mobile device receives an indication from a remote NFC device that the NFC transaction to be conducted is financial during a handshake operation. At step 420, proximity data is collected. In order to select which financial account the user desires to use for the transaction, the user may grip different locations on the mobile device. Based on where the user is gripping the mobile device, the proximity data gathered at step 420 may indicate a different location on the mobile device. At step 430, the proximity data is used to select the data for transmission. In this example, the data indicates the selected financial account. As such, based on where the user is gripping the mobile device, a different financial account may be debited to fund the financial transaction conducted via NFC. Further, based on where the mobile device is gripped, the selected financial account may be indicated on a screen of the mobile device. The data selected at step 430 for transmission may indicate the financial account associated with where the user's hand is gripping the mobile device.

As a second exemplary embodiment, method 400 may be used to unlock a vehicle. At step 410, a user may provide input to the mobile device that indicates that the user's vehicle is to be unlocked. Alternatively, the mobile device may, during a handshake operation, receive an indication from a remote NFC device of the vehicle that indicates the NFC transaction to be conducted relates to unlocking the vehicle. At step 420, proximity data may be collected by the mobile device. The user may have multiple options for unlocking the vehicle. For example, options may include: unlocking only the driver's door, unlocking all doors, unlocking the trunk or back hatch, and/or unlocking the doors and lowering the windows. In order to select which unlocking option that the user desires, the user may slide his hand along the mobile device. The user may initially grip the mobile device by or near its base. As the user slides the mobile device through his hand, the unlocking option selected may change. For example, a display of the mobile device may initially provide an indication that only the driver's door is selected for unlocking, and after the user slides his hand to a second location, all doors may be selected for unlocking. If the user continues to slide his hand, a third option may be presented. Based on where the user's hand is located in relation to the mobile device when the user stops sliding the mobile device may determine what data is transmitted to the remote NFC device of the vehicle at step 430. This data may indicate the unlocking option selected by the user. In some embodiments, the location of the user's hand in relation to the mobile device (as indicated by the proximity data) when the user stops sliding the mobile device may determine which unlocking option is selected. In some embodiments, the location of the user's hand in relation to the mobile device (as indicated by the proximity data) where the user begins sliding the mobile device may determine which unlocking option is selected (the sliding motion may serve as the confirmation of the selected option). In some embodiments, the distance the mobile device is slid through the user's hand may determine the selected option.

While the above two examples of method 400 relate to a financial NFC transaction and an unlocking NFC transaction using gestures, other forms of NFC transactions may also be possible.

Figure 5:
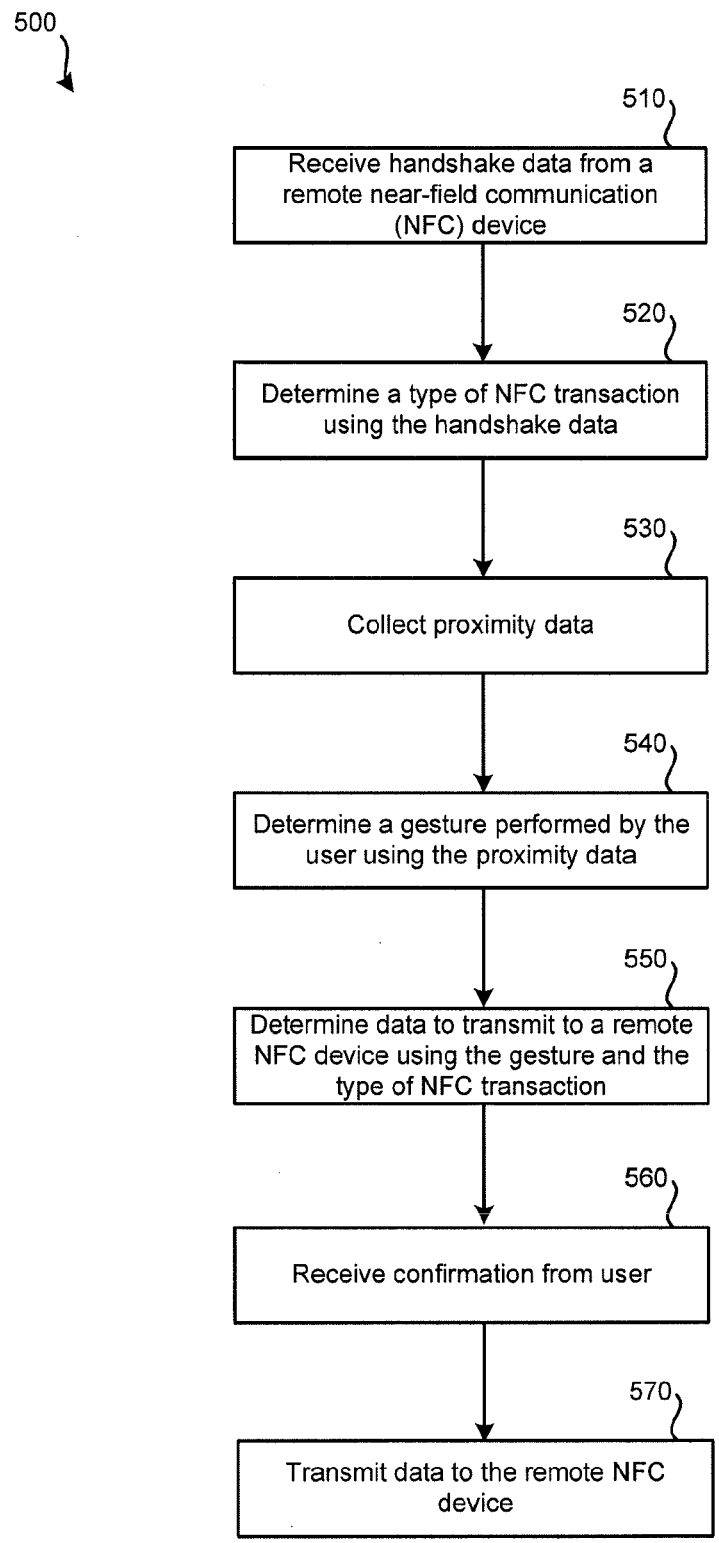
FIG. 5 illustrates another embodiment of a method for selecting data for transmission via NFC.

FIG. 5 illustrates another embodiment of a method 500 for selecting data for transmission via NFC. Method 500 may be performed using system 100 or some other system configured to select data for transmission from a mobile device via NFC. Method 500 may be performed using a mobile device, such as the mobile devices of FIGS. 2 and 3. Means for performing each step of method 500 include a mobile device, which may include a system such as system 100 of FIG. 1, one or more proximity sensors, and/or a computer system. Method 500 may represent a more detailed embodiment of method 400 or a separate method.

At step 510, handshake data may be received by the mobile device from a remote NFC device with which the NFC transaction is to be conducted. The handshake data may be received upon the mobile device being moved into proximity with the remote NFC device. For example, being within proximity may refer to a distance of approximately 20 cm or less (the approximate maximum range of NFC). In some embodiments, either the mobile device or the remote NFC device may be triggered to initiate a handshake operation resulting in handshake data being received by the mobile device from the remote NFC device. The handshake data may either specify the type of transaction that is to be performed with the remote NFC device or contain sufficient information such that the mobile device can determine the type of NFC transaction that is to be performed with the remote NFC device. At step 520, the handshake data received at step 510 may be used to determine the type of NFC transaction that is to be conducted with the remote NFC device.

At step 530, proximity data may be collected by the mobile device using one or more proximity sensors present on the mobile device. Such proximity data may indicate: whether a triggering entity, such as a user's hand, is in proximity (touching or near) to the proximity sensor and/or a magnitude. Such a magnitude may be greater the closer a triggering entity is to the proximity sensor. As such, it may be possible to adjust sensitivity to triggering entities by setting a threshold magnitude used to determine whether a triggering entity is considered proximate to the proximity sensor or not. The greater the threshold, the closer the triggering entity may need to be to the proximity sensor for the triggering entity to be considered proximate to the proximity sensor. In some embodiments, if no proximity data is received from a proximity sensor, it may be assumed that a triggering entity is not proximate to the proximity sensor. The proximity sensors used in method 500 may be single- or dual-electrode capacitive proximity sensors.

At step 540, a gesture performed by the user may be determined. The gesture may be determined using the proximity data collected at step 530. The gesture performed by the user may be performed without using a display of the mobile device. For instance, the display of the mobile device may be shut off or may present information related to the NFC transaction. Since the gesture is not performed on the display of the mobile device, at least some embodiments of method 500 may be performed without any use of a display or without use of the display to collect information related to the data to be transmitted. The gesture may involve how the mobile device is being held (e.g., gripped) by a user. For example, whether the mobile device is being gripped in the user's hand near the top, middle, or bottom of the mobile device may represent different types of gestures (wherein the top refers to the portion of the mobile device having a speaker and the bottom referring to the location on the mobile device where the microphone is located).

The gesture may also involve movement of the user's hand in relation to the mobile device. The mobile device may be slid through the user's hand. In order to slide the mobile device through the user's hand, the user may use the remote NFC device as an anchor point. As such, the sliding motion forces the mobile device to be proximate to the remote NFC device by the remote NFC device being needed as an anchor point to assist in the sliding motion. The mobile device may then be slid through the user's hand, thus resulting in the mobile device remaining approximately motionless and the user's hand moving closer to the remote NFC device. Where the user begins or ends the sliding motion in relation to the mobile device may affect the gesture determined at step 540. In some embodiments, the total distance slid by the mobile device through the user's hand may affect the gesture determined at step 540. As the gesture is being performed, the display of the mobile device may indicate the data selected for transmission to the remote NFC device. For instance, if the data selected is based on where the user's hand is in relation to the mobile device when the user ceases sliding the mobile device through his hand, the display may indicate the data that would be transmitted if the user stopped sliding the mobile device immediately and dynamically update if the user continues to slide his hand. As such, as the user is sliding the mobile device through his hand, the display may update to indicate different data. When the desired data is displayed, the user may stop sliding the mobile device through his hand. Additionally or alternatively, auditory or haptic feedback may be provided by the mobile device to the user to indicate the data selected by the user's gesture.

At step 550, the data to transmit to the remote NFC device may be determined based on the identified gesture of step 540. The gesture identified at step 540 may have been previously associated with data. Step 550 may be performed concurrently with step 540. For example, gripping of the middle of a mobile device may be associated with a first financial account while gripping of the top of the mobile device may be associated with a second financial account. As such, without providing input via one or more buttons or a touch screen, a user may provide input to the mobile device that indicates what data is to be transmitted via the NFC transaction.

At step 560, to complete the transaction, the user may need to provide additional input to serve as a confirmation of the data to be transmitted to the remote NFC device. For example, by pushing a button on the mobile device, the user may provide authorization for the data determined at step 550 to be transmitted to the remote NFC device. In some embodiments, additional proximity data may be used: if the user maintains a grip position for at least a threshold period of time, the data determined at step 550 may be transmitted to the remote NFC device. Additional proximity data may be used in other ways to confirm the data to be transmitted to the remote NFC device. For instance, if the user slides his hand to near the end of the mobile device touching the remote NFC device, this may serve as confirmation of the data to be transmitted to the remote NFC device. By using proximity data, the display of the mobile device may not need to be used to receive input and/or confirm the data to be transmitted at step 560. At step 570, the data determined at step 550 may be transmitted to the remote NFC device. The data may be transmitted via NFC.

Figure 6:
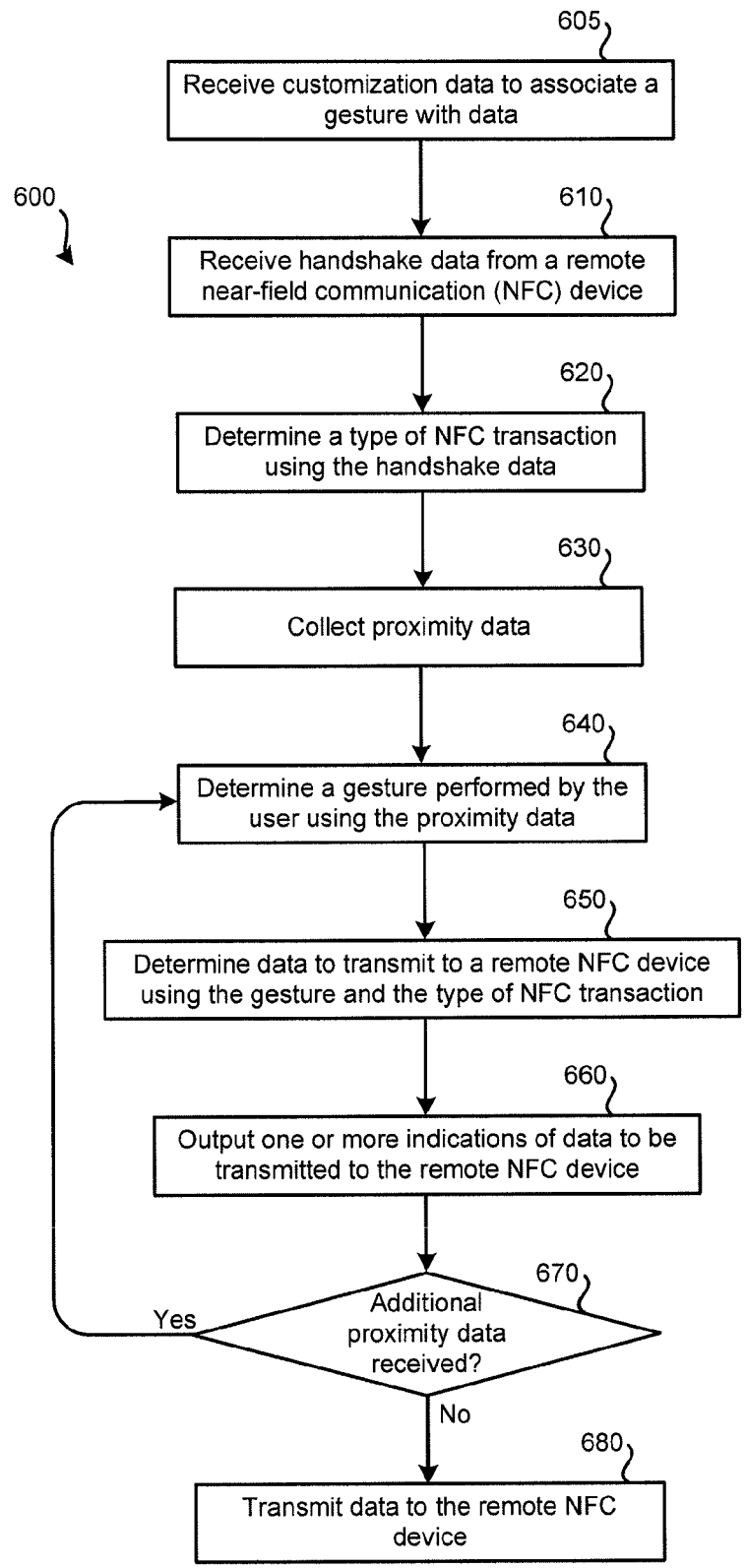
FIG. 6 illustrates another embodiment of a method for selecting data for transmission via NFC.

FIG. 6 illustrates another embodiment of a method 600 for selecting data for transmission via NFC. Method 600 may be performed using system 100 or some other system configured to select data for transmission from a mobile device via NFC. Method 600 may be performed using a mobile device, such as the mobile devices of FIGS. 2 and 3. Means for performing each step of method 600 include a mobile device, which may include a system such as system 100 of FIG. 1, one or more proximity sensors, and/or a computer system. Method 600 may represent a more detailed embodiment of methods 400, 500, or a separate method.

At step 605, customization data may be received. Such customization data may be received from a user. The customization data may serve to associate a gesture with particular data. The same gesture may be associated with multiple pieces of data, wherein the particular data associated with the gesture for a given NFC transaction is selected based on the type of NFC transaction. For example, gripping the mobile device near the middle may be associated with a first financial account during a financial NFC transaction but may be associated with opening a vehicle's trunk during an unlocking NFC transaction.

At step 610, handshake data may be received by the mobile device from a remote NFC device. The handshake data may be received upon the mobile device being moved into proximity with the remote NFC device. For example, being within proximity may refer to a distance of approximately 20 cm or less (the approximate maximum range of NFC). In some embodiments, either the mobile device or the remote NFC device may be triggered to initiate a handshake operation resulting in handshake data being received by the mobile device from the remote NFC device. The handshake data may either specify the type of transaction that is to be performed with the remote NFC device or contain information sufficient such that the mobile device can determine the type of transaction that is to be performed with the remote NFC device. At step 620, the handshake data received at step 610 may be used to determine the type of NFC transaction that is to be conducted with the remote NFC device.

At step 630, proximity data may be collected by the mobile device using one or more proximity sensors present on the mobile device. Proximity data may be collected using one or more proximity sensors of the mobile device. For example, referring to FIGS. 2A-2C, some or all of the proximity sensors may be used to collect proximity data. Such proximity data may indicate: whether a triggering entity, such as a user's hand, is in proximity (touching or near) to the proximity sensor and/or a magnitude. Such a magnitude may be greater the closer a triggering entity is to the proximity sensor. As such, the closer a triggering entity gets to a proximity sensor, the greater the magnitude measured may be. Therefore, small changes in the location of the triggering entity in relation to a proximity sensor may be detected. In some embodiments, if no proximity data is received from a proximity sensor, it may be assumed that a triggering entity is not proximate to the proximity sensor. The proximity sensors used in method 600 may be single- and/or dual-electrode capacitive proximity sensors.

At step 640, a gesture performed by a user may be determined. The gesture may be determined using the proximity data collected at step 630. The gesture performed by the user may be performed without using a display of the mobile device. For instance, the display of the mobile device may be shut off or may present information related to the NFC transaction (but does not receive the data related to the gesture). Since the gesture is not performed on the display of the mobile device, at least some embodiments of method 600 may be performed without any use of a display or without use of the display to collect information related to the data to be transmitted. The gesture may involve how the mobile device is being held (e.g., gripped) by a user. For example, whether the mobile device is being gripped in the user's hand near the top, middle, or bottom of the mobile device may be different types of gestures (wherein the top refers to the portion of the mobile device having a speaker and the bottom referring to the location on the mobile device where the microphone is located).

The gesture may also involve movement of the user's hand in relation to the mobile device. The mobile device may be slid through the user's hand. In order to slide the mobile device through the user's hand, the user may use the remote NFC device (or some other fixed object) as an anchor point, such as illustrated in FIGS. 3A and 3B. As such, the sliding motion forces the mobile device to be proximate to the remote NFC device by the remote NFC device being used as an anchor point to assist in the sliding motion. The mobile device may then be slid through the user's hand, thus resulting in the mobile device remaining approximately motionless and the user's hand moving closer to the remote NFC device. Where the user begins or ends the sliding motion in relation to the mobile device may affect the gesture determined at step 640. In some embodiments, the total distance slid by the mobile device through the user's hand may affect the gesture determined at step 640. As the gesture is being performed, the display of the mobile device may indicate data for transmission to the remote NFC device. For instance, if the data transmitted is based on where the user's hand is in relation to the mobile device when the user ceases sliding the mobile device through his hand, the display may indicate the data that would be transmitted if the user stopped sliding the mobile device immediately (such as an indication of a financial account or an indication of which vehicle doors would be unlocked). Accordingly, as the user is sliding the mobile device through his hand, the display may update to indicate different data. To view the display, the user may allow the mobile device to slide through the user's hand while the mobile device is being held in a palm up grip, such that the mobile device is supported from the sides and/or the rear of the mobile device (that is, the side of the mobile device not having the display being used). When an indication of the desired data to be transmitted is displayed, the user may stop sliding the mobile device through his hand. Additionally or alternatively, auditory or haptic feedback may be provided by the mobile device to the user to provide an indication of the data selected by the user's gesture.

At step 650, data to transmit to the remote NFC device may be determined based on the identified gesture of step 640. The gesture identified at step 640 may have been previously associated with data, either by a user or by a third-party, such as the mobile device's manufacturer or mobile network operator. For example, gripping of the middle of a mobile device may be associated with a first financial account while gripping of the top of the mobile device may be associated with a second financial account. As such, without providing input via one or more buttons or a touch screen, a user may provide input to the mobile device that indicates what data is to be transmitted via the NFC transaction.

At step 660, one or more indications of data that is to be transmitted to the remote NFC device may be presented by the mobile device to the user. The indications may be visual (via a display of the mobile device), haptic (e.g., a vibration), or auditory (e.g., an indication of the data may be output by the speaker of the mobile device). The one or more indications output at step 660 may serve as a confirmation.

If, at step 670, additional proximity data that modifies the gesture is not received, the data associated with the gesture determined at step 650 may be transmitted to the remote NFC device. Additional proximity data that does not modify the gesture may be proximity data that indicates the hand of the user is not moving. However, at step 670, if additional proximity data is received that modifies the gesture, method 600 may return to step 640. This may occur if the user (accidentally) initially performed a gesture that selects data for transmission that the user does not want to transmit.

As an example of this, consider a sliding gesture performed by the user. If, upon completing the sliding gesture, the gesture identified at step 640 is determined to relate to a first piece of data at step 650, an indication of the data may be output (such as via a display of the mobile device) to the user at step 660. Upon receiving the indication, the user may reperform the gesture or modify the gesture (such as by continuing the sliding motion or reversing the sliding motion) to select different data for transmission.

As such, if additional proximity data is received at step 670, the gesture initially determined at step 640 may be revised in accordance with the additional proximity data received at step 670. Steps 650 and 660 may be performed again such that the data determined to be transmitted is changed and the indication output to the user is similarly changed. At step 680, the data either initially selected or selected when the gesture is revised may be transmitted to the remote NFC device.

Figure 7:
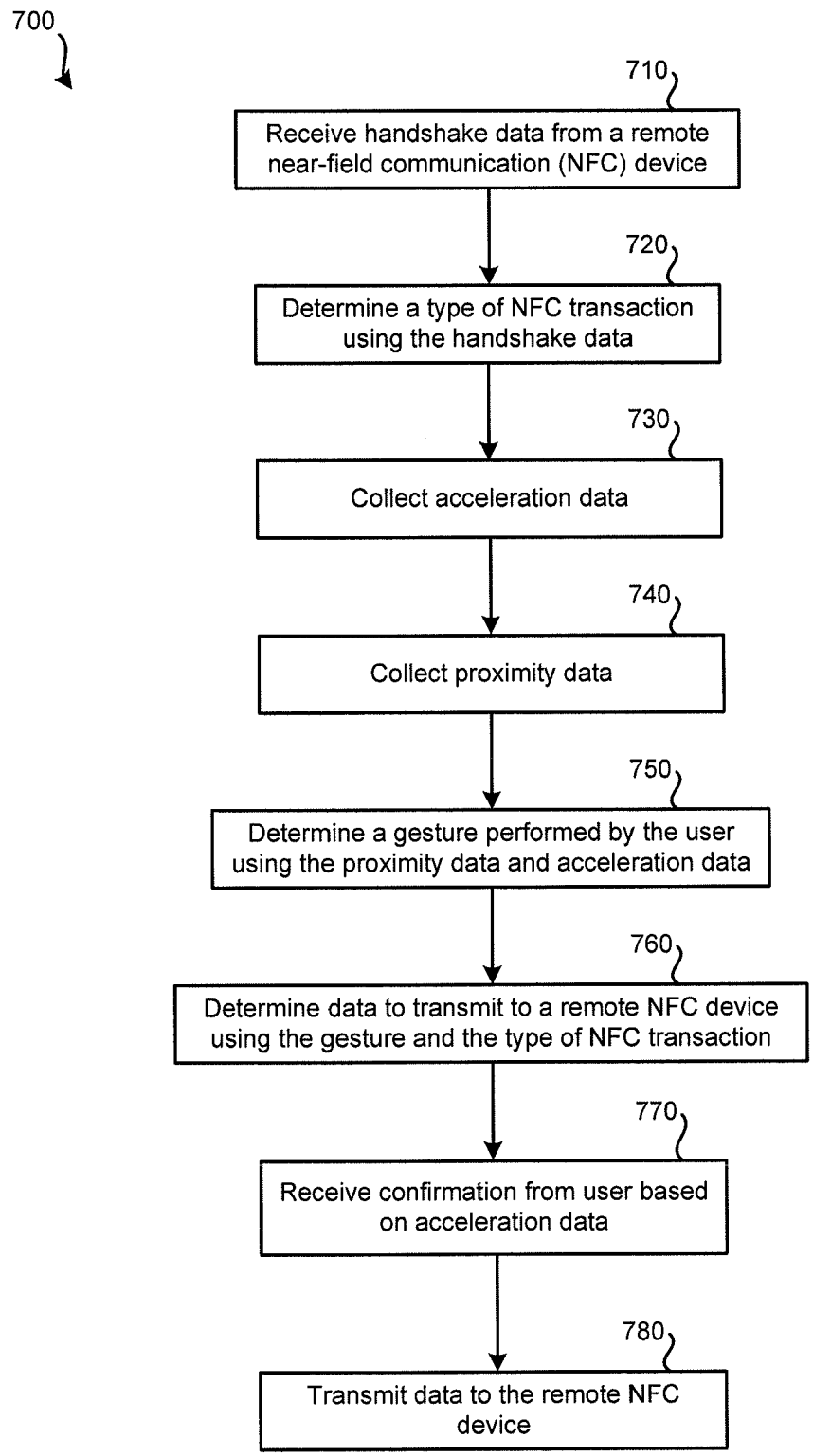
FIG. 7 illustrates an embodiment of a method for selecting data for transmission via NFC using acceleration data.

FIG. 7 illustrates an embodiment of a method 700 for selecting data for transmission via NFC using acceleration data. Method 700 may be performed using system 100 or some other system configured to select data for transmission from a mobile device via NFC. Method 700 may be performed using a mobile device, such as the mobile devices of FIGS. 2 and 3. Means for performing each step of method 700 include a mobile device, which may include a system such as system 100 of FIG. 1, one or more proximity sensors, one or more accelerometers, and/or a computer system. Method 700 may represent an embodiment of methods 400, 500, 600 or a separate method.

At step 710, handshake data may be received by the mobile device from a remote NFC device. The handshake data may be received upon the mobile device being moved into proximity with the remote NFC device. For example, being within proximity may refer to a distance of approximately 20 cm or less (the approximate maximum range of NFC). In some embodiments, either the mobile device or the remote NFC device may be triggered to initiate a handshake operation resulting in handshake data being received by the mobile device from the remote NFC device. The handshake data may either specify the type of transaction that is to be performed with the remote NFC device or contain information sufficient such that the mobile device can determine the type of transaction that is to be performed with the remote NFC device. At step 720, the type of NFC transaction to be conducted with the remote NFC device may be determined by the mobile device using the handshake data.

At step 730, acceleration data may be collected by the mobile device using one or more accelerometers. Such acceleration data may indicate: 1) a direction of acceleration; and 2) a magnitude of acceleration. Such acceleration data may periodically be received by one or more processors of the mobile device. The direction of the acceleration may use a coordinate system of the mobile device, such as illustrated in FIGS. 2A through 2C. Due to the effect of gravity, it may be possible to determine how the mobile device is oriented in relation to the direction of gravity using acceleration data from one or more accelerometers.

At step 740, proximity data may be collected by the mobile device using one or more proximity sensors present on the mobile device. Proximity data may be collected using one or more proximity sensors of the mobile device. For example, referring to FIGS. 2A-2C, some or all of the proximity sensors may be used to collect proximity data. Such proximity data may indicate: whether a triggering entity, such as a user's hand, is in proximity (touching or near) to the proximity sensor and/or a magnitude. Such a magnitude may be greater the closer a triggering entity is to the proximity sensor. As such, the closer a triggering entity gets to a proximity sensor, the greater the magnitude measured may be. Therefore, small changes in the location of the triggering entity in relation to a proximity sensor may be detected. In some embodiments, if no proximity data is received from a proximity sensor, it may be assumed that a triggering entity is not proximate to the proximity sensor. The proximity sensors used for method 700 may be single- and/or dual-electrode capacitive proximity sensors.

At step 750, a gesture performed by a user may be determined. The gesture may be determined using the proximity data collected at step 730 and/or the acceleration data collected at step 720. The gesture performed by the user may be performed without using a display of the mobile device. For instance, the display of the mobile device may be shut off or may present information related to the NFC transaction. Since the gesture may not be performed using the display of the mobile device, at least some embodiments of method 700 may be performed without any use of a display and/or without use of the display to collect information related to the data to be transmitted. The gesture may involve how the mobile device is being held (e.g., gripped) by a user. For example, whether the mobile device is being gripped in the user's hand near the top, middle, or bottom of the mobile device may be different types of gestures (wherein the top refers to the portion of the mobile device having a speaker and the bottom referring to the location on the mobile device where the microphone is located). Additionally or alternatively, since acceleration data may be used to determine the gesture, the orientation of the mobile device in relation to the pull of gravity may be measured. As such, a gesture may involve rotating the mobile device (such as to mimic a key turning an ignition switch). In some embodiments, whether the face of the mobile device (which contains the main display of the mobile device) is facing left, right, up, or down may affect which gesture is determined. In some embodiments, an angle that the mobile device is held at (in relation to the pull of gravity) may affect the gesture determined.

The gesture may also involve movement of the user's hand in relation to the mobile device. The mobile device may be slid through the user's hand. In order to slide the mobile device through the user's hand, the user may use the remote NFC device as an anchor point, such as illustrated in FIGS. 3A and 3B. As such, the sliding motion forces the mobile device to be proximate to the remote NFC device by the remote NFC device being needed as an anchor point to assist in the sliding motion. The mobile device may then be slid through the user's hand, thus resulting in the mobile device remaining approximately motionless and the user's hand moving closer to the remote NFC device. Where the user begins or ends the sliding motion in relation to the mobile device may affect the gesture determined at step 540. In some embodiments, the total distance slid by the mobile device through the user's hand may affect the gesture determined at step 540. As the gesture is being performed, the display of the mobile device may indicate data for transmission to the remote NFC device. For instance, if the data transmitted is based on where the user's hand is in relation to the mobile device when the user ceases sliding the mobile device through his hand, the display may indicate the data that would be transmitted if the user stopped sliding the mobile device immediately. As such, as the user is sliding the mobile device through his hand, the display may update to indicate different data. When the desired data is displayed, the user may stop sliding the mobile device through his hand. Additionally or alternatively, auditory or haptic feedback may be provided by the mobile device to the user to indicate the data selected by the user's gesture.

At step 760, data to transmit to the remote NFC device may be determined based on the identified gesture of step 750. The gesture identified at step 750 may have been previously associated with data, either by a user or by a third-party, such as the mobile device's manufacturer or mobile network operator.

At step 770, to complete the transaction, the user may provide additional input to serve as a confirmation of the data to be transmitted to the remote NFC device. Such a confirmation may be identified from acceleration data. For example, the user may turn the mobile device, such as to mimic the turning of a key in an ignition switch of a vehicle or lock, to serve as a confirmation. As an example of proximity data being used in conjunction with acceleration data to select data for transmission during an NFC transaction, a user may place a mobile device against a remote NFC device, the user may then slide his hand along the mobile device until an indication of the data desired for transmission is selected on the mobile device. To confirm transmission of this data, the user may turn the mobile device, such as to the left or the right, using the remote NFC device as the pivot for turning the mobile device. If, rather than turning the mobile device, the user continues or reverses the direction of the slide of the user's hand, different data may be selected for transmission. If the mobile device is moved away from the remote NFC device before the mobile device is rotated, the NFC transaction may be aborted. At step 780, the data determined at step 760 (and confirmed at step 770) may be transmitted to the remote NFC device via NFC.

Figure 8:
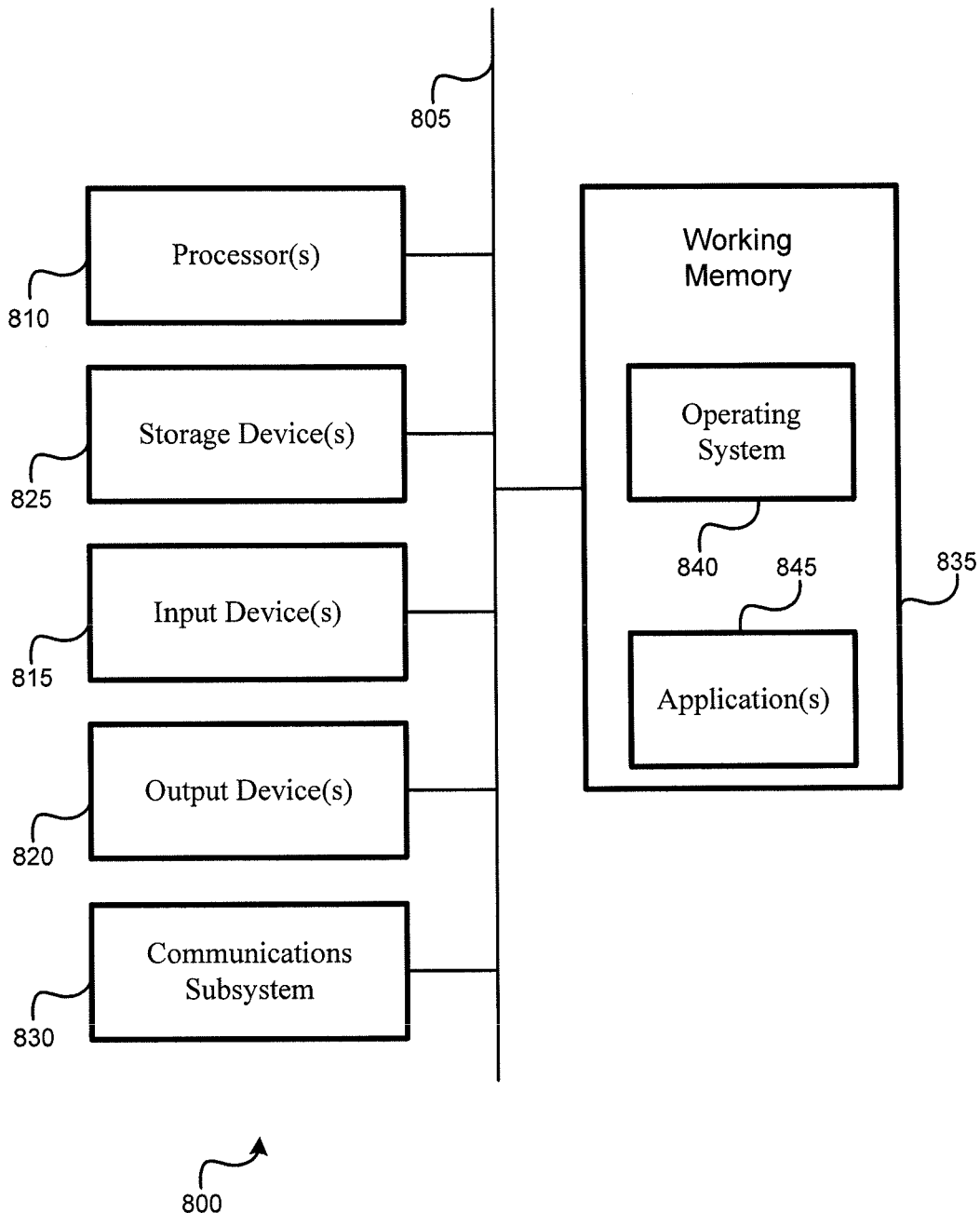
FIG. 8 illustrates an embodiment of a computer system.

FIG. 8 illustrates an embodiment of a computer system. A computer system as illustrated in FIG. 8 may be incorporated as part of the previously described mobile devices and remote NFC devices. For example, computer system 800 can represent some of the components of the mobile devices discussed in this application. FIG. 8 provides a schematic illustration of one embodiment of a computer system 800 that can perform the methods provided by various other embodiments, as described herein, in conjunction with a system, such as system 100. System 100 may be incorporated with a computer system, such as computer system 800. As such, a mobile device may include computer system 800 of FIG. 8 and system 100 of FIG. 1. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 805 (or may otherwise be in communication, as appropriate). The hardware elements may include one or more processors 810, including without limitation one or more general-purpose processors and/or one or more special-purpose processors (such as digital signal processing chips, graphics acceleration processors, and/or the like); one or more input devices 815, which can include without limitation a mouse, a keyboard, and/or the like; and one or more output devices 820, which can include without limitation a display device, a printer, and/or the like.

The computer system 800 may further include (and/or be in communication with) one or more non-transitory storage devices 825, which can comprise, without limitation, local and/or network accessible storage, and/or can include, without limitation, a disk drive, a drive array, an optical storage device, a solid-state storage device such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 800 might also include a communications subsystem 830, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 830 may permit data to be exchanged with a network (such as the network described below, to name one example), other computer systems, and/or any other devices described herein. In many embodiments, the computer system 800 will further comprise a working memory 835, which can include a RAM or ROM device, as described above.

The computer system 800 also can comprise software elements, shown as being currently located within the working memory 835, including an operating system 840, device drivers, executable libraries, and/or other code, such as one or more application programs 845, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 825 described above. In some cases, the storage medium might be incorporated within a computer system, such as computer system 800. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 800) to perform methods in accordance with various embodiments of the invention. According to a set of embodiments, some or all of the procedures of such methods are performed by the computer system 800 in response to processor 810 executing one or more sequences of one or more instructions (which might be incorporated into the operating system 840 and/or other code, such as an application program 845) contained in the working memory 835. Such instructions may be read into the working memory 835 from another computer-readable medium, such as one or more of the storage device(s) 825. Merely by way of example, execution of the sequences of instructions contained in the working memory 835 might cause the processor(s) 810 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 800, various computer-readable media might be involved in providing instructions/code to processor(s) 810 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 825. Volatile media include, without limitation, dynamic memory, such as the working memory 835.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800.

The communications subsystem 830 (and/or components thereof) generally will receive signals, and the bus 805 then might carry the signals (and/or the data, instructions, etc. carried by the signals) to the working memory 835, from which the processor(s) 810 retrieves and executes the instructions. The instructions received by the working memory 835 may optionally be stored on a storage device 825 either before or after execution by the processor(s) 810.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method for selecting data for transmission from a mobile device, the method comprising:
   collecting, by the mobile device, proximity data indicating proximity between one or more proximity sensors and a triggering entity;
   determining, by the mobile device, a type of near-field communication (NFC) transaction; and
   determining, by the mobile device, using the proximity data and the type of the NFC transaction, data to transmit to a remote NFC device, wherein such determining comprises:
      determining a gesture using the proximity data, wherein:
         the gesture is performed by a hand of a user;
         the gesture comprises sliding the mobile device through a grip of the hand of the user; and
         the triggering entity is the hand of the user; and
      determining, by the mobile device, using the gesture and the type of the NFC transaction, data to transmit to the remote NFC device.

2. The method for selecting the data for transmission from the mobile device of claim 1, wherein the gesture further comprises the remote NFC device being used as an anchor point for the user to slide the mobile device through the grip of the hand of the user.

3. The method for selecting the data for transmission from the mobile device of claim 1, wherein determining the gesture using the proximity data comprises:
   determining, by the mobile device, a location on the mobile device where the user ceases sliding the mobile device though the hand of the user, wherein the data to transmit to the remote NFC device is at least partially based on the location.

4. The method for selecting the data for transmission from the mobile device of claim 1, wherein determining the gesture using the proximity data comprises:
 determining, by the mobile device, a location on the mobile device where the user commences sliding the mobile device though the hand of the user, wherein the data to transmit to the remote NFC device is at least partially based on the location.

5. The method for selecting the data for transmission from the mobile device of claim 1, further comprising:
 collecting, by the mobile device, acceleration data, wherein determining, by the mobile device, using the proximity data and the type of the NFC transaction, data to transmit to the remote NFC device comprises:
 determining, by the mobile device using the proximity data, the acceleration data, and the type of the NFC transaction, the data to transmit to the remote NFC device.

6. The method for selecting the data for transmission from the mobile device of claim 1, further comprising:
 transmitting the data to the remote NFC device.

7. The method for selecting the data for transmission from the mobile device of claim 1, wherein the one or more proximity sensors are capacitive proximity sensors.

8. A mobile device configured to select data for transmission, the mobile device comprising:
 one or more proximity sensors;
 a near-field communication transceiver;
 a processor; and
 a memory communicatively coupled with and readable by the processor and having stored therein processor-readable instructions which, when executed by the processor, cause the processor to:
 analyze proximity data indicating proximity between the one or more proximity sensors and a triggering entity;
 determine a type of near-field communication (NFC) transaction; and
 determine using the proximity data and the type of the NFC transaction, data to transmit to a remote NFC device, wherein the processor-readable instructions, which, when executed by the processor, cause the processor to determine data to transmit to the remote NFC device further comprises processor-readable instructions, which, when executed, cause the processor to:
 determine a gesture using the proximity data, wherein:
 the gesture is performed by a hand of a user;
 the gesture comprises sliding the mobile device through a grip of the hand of the user; and
 the triggering entity is the hand of the user; and
 determine, using the gesture and the type of the NFC transaction, data to transmit to the remote NFC device.

9. The mobile device configured to select the data for transmission from the mobile device of claim 8, wherein the gesture further comprises the remote NFC device being used as an anchor point for the user to slide the mobile device through the grip of the hand of the user.

10. The mobile device configured to select the data for transmission from the mobile device of claim 8, wherein the processor-readable instructions, which, when executed by the processor, cause the processor to determine the gesture using the proximity data further comprises processor-readable instructions, which, when executed, cause the processor to:
 determine a location on the mobile device where the user ceases sliding the mobile device though the hand of the user, wherein the data to transmit to the remote NFC device is at least partially based on the location.

11. The mobile device configured to select the data for transmission from the mobile device of claim 8, wherein the processor-readable instructions, which, when executed by the processor, cause the processor to determine the gesture using the proximity data further comprises processor-readable instructions, which, when executed, cause the processor to:
 determine a location on the mobile device where the user commences sliding the mobile device though the hand of the user, wherein the data to transmit to the remote NFC device is at least partially based on the location.

12. The mobile device configured to select the data for transmission from the mobile device of claim 8, the mobile device further comprising an accelerometer, wherein the processor-readable instructions further comprise processor-readable instructions, which, when executed by the processor, cause the processor to:
 analyze acceleration data received from the accelerometer, wherein the processor-readable instructions, which, when executed by the processor, cause the processor to determine, using the proximity data and the type of the NFC transaction, data to transmit to the remote NFC device further comprise processor-readable instructions, which, when executed, cause the processor to:
 determine, using the proximity data, the acceleration data, and the type of the NFC transaction, the data to transmit to the remote NFC device.

13. The mobile device configured to select the data for transmission from the mobile device of claim 8, wherein the processor-readable instructions further comprise processor-readable instructions, which, when executed by the processor, cause the processor to:
 cause the data to be transmitted to the remote NFC device.

14. The mobile device configured to select the data for transmission from the mobile device of claim 8, wherein the one or more proximity sensors are capacitive proximity sensors.

15. A computer program for selecting data for transmission, the computer program comprising processor-readable instructions, which, when executed by a processor, cause the processor to:
 analyze proximity data indicating proximity between one or more proximity sensors and a triggering entity;
 determine a type of near-field communication (NFC) transaction; and
 determine using the proximity data and the type of the NFC transaction, data to transmit to a remote NFC device, wherein the processor-readable instructions, which, when executed by the processor, cause the processor to determine data to transmit to the remote NFC device further comprises processor-readable instructions, which, when executed, cause the processor to:
 determine a gesture using the proximity data, wherein:
 the gesture is performed by a hand of a user;
 the gesture comprises sliding the mobile device through a grip of the hand of the user; and
 the triggering entity is the hand of the user; and
 determine, by the mobile device, using the gesture and the type of the NFC transaction, data to transmit to the remote NFC device.

16. The computer program of claim 15, wherein the gesture further comprises the remote NFC device being used as an anchor point for the user to slide the mobile device through the grip of the hand of the user.

17. The computer program of claim 15, wherein the processor-readable instructions, which, when executed by the processor, cause the processor to determine the gesture using the proximity data further comprises processor-readable instructions, which, when executed, cause the processor to:
    determine a location on the mobile device where the user ceases sliding the mobile device though the hand of the user, wherein the data to transmit to the remote NFC device is at least partially based on the location.

18. The computer program of claim 15, wherein the processor-readable instructions, which, when executed by the processor, cause the processor to determine the gesture using the proximity data further comprises processor-readable instructions, which, when executed, cause the processor to:
    determine a location on the mobile device where the user commences sliding the mobile device though the hand of the user, wherein the data to transmit to the remote NFC device is at least partially based on the location.

19. The computer program of claim 15, wherein the processor-readable instructions further comprise processor-readable instructions, which, when executed by the processor, cause the processor to:
    analyze acceleration data, wherein the processor-readable instructions, which, when executed by the processor, cause the processor to determine, using the proximity data and the type of the NFC transaction, data to transmit to the remote NFC device further comprises processor-readable instructions, which, when executed, cause the processor to:
        determine, using the proximity data, the acceleration data, and the type of NFC transaction, the data to transmit to the remote NFC device.

20. The computer program of claim 15, wherein the processor-readable instructions further comprise processor-readable instructions, which, when executed by the processor, cause the processor to:
    cause the data to be transmitted to the remote NFC device.

21. The computer program of claim 15, wherein the one or more proximity sensors are capacitive proximity sensors.

22. An apparatus for selecting data for transmission from a mobile device, the apparatus comprising:
    means for collecting proximity data indicating proximity to a triggering entity;
    means for determining a type of near-field communication (NFC) transaction; and
    means for determining, using the proximity data and the type of the NFC transaction, data to transmit to a remote NFC device, wherein the means for determining comprises:
        means for determining a gesture using the proximity data, wherein:
            the gesture is performed by a hand of a user;
            the gesture comprises sliding the mobile device through a grip of the hand of the user; and
            the triggering entity is the hand of the user; and
        means for determining, using the gesture and the type of the NFC transaction, data to transmit to the remote NFC device.

23. The apparatus for selecting the data for transmission from the mobile device of claim 22, wherein the gesture further comprises the remote NFC device being used as an anchor point for the user to slide the mobile device through the grip of the hand of the user.

24. The apparatus for selecting the data for transmission from the mobile device of claim 22, wherein the means for determining the gesture using the proximity data comprises:
    means for determining a location on the mobile device where the user ceases sliding the mobile device though the hand of the user, wherein the data to transmit to the remote NFC device is at least partially based on the location.

25. The apparatus for selecting the data for transmission from the mobile device of claim 22, wherein the means for determining the gesture using the proximity data comprises:
    means for determining a location on the mobile device where the user commences sliding the mobile device though the hand of the user, wherein the data to transmit to the remote NFC device is at least partially based on the location.

26. The apparatus for selecting the data for transmission from the mobile device of claim 22, further comprising:
    means for collecting acceleration data, wherein the means for determining, using the proximity data and the type of the NFC transaction, data to transmit to the remote NFC device comprises:
        means for determining, using the proximity data, the acceleration data, and the type of the NFC transaction, data to transmit to the remote NFC device.

27. The apparatus for selecting the data for transmission from the mobile device of claim 22, further comprising:
    means for transmitting the data to the remote NFC device.

\* \* \* \* \*